(12) United States Patent
Wang et al.

(10) Patent No.: US 12,742,632 B2
(45) Date of Patent: Sep. 22, 2026

(54) METHOD AND SYSTEM FOR DETECTING POSITIONING ERROR OF LINEAR MOVING MECHANISM

(71) Applicants: NANJING KINGYOUNG INTELLIGENT SCIENCE & TECHNOLOGY CO., LTD., Nanjing (CN); SHANGHAI WEITONG VISION TECHNOLOGY CO., LTD., Shanghai (CN)

(72) Inventors: Chunmei Wang, Nanjing (CN); Yi Huang, Nanjing (CN); Cong Wang, Nanjing (CN)

(73) Assignee: NANJING KINGYOUNG INTELLIGENT SCIENCE & TECHNOLOGY CO.LTD, Nanjing (CN)

(*) Notice: Subject to any disclaimer, the term of this patent is extended or adjusted under 35 U.S.C. 154(b) by 0 days.

(21) Appl. No.: 18/880,496

(22) PCT Filed: Jul. 19, 2024

(86) PCT No.: PCT/CN2024/106575
§ 371 (c)(1),
(2) Date: Dec. 31, 2024

(87) PCT Pub. No.: WO2025/016460
PCT Pub. Date: Jan. 23, 2025

(65) Prior Publication Data

US 2025/0305813 A1 Oct. 2, 2025

(30) Foreign Application Priority Data

Jul. 17, 2023 (CN) ........................ 202310869997.3

(51) Int. Cl.
*G01B 11/00* (2006.01)

(52) U.S. Cl.
CPC ................................ *G01B 11/002* (2013.01)

(58) Field of Classification Search
CPC .................................................. G01B 11/002
See application file for complete search history.

(56) References Cited

U.S. PATENT DOCUMENTS

2014/0163737 A1* 6/2014 Nagata .................. B25J 9/1697
700/259
2019/0180476 A1* 6/2019 Matsuzawa ........... H04N 25/61

FOREIGN PATENT DOCUMENTS

CN 102141376 A 8/2011
CN 102809350 A 12/2012
(Continued)

OTHER PUBLICATIONS

Peng Xue, Xiaodong Chai, Shubing Zheng, Research on vision-based measurement method of vehicle and track relative vibration state, journal, 2016, pp. 0039-0041,p. 0045, issue 01, Computer measurement and control, China.
(Continued)

*Primary Examiner* — Hyun D Park
(74) *Attorney, Agent, or Firm* — Ming Jiang; OPENPTO US LLC

(57) ABSTRACT

A method and a system for detecting positioning error of a linear moving mechanism are provided, which includes a linear moving mechanism, a moving element, a visual sensor, a calibration object and a data processing system. The vision sensor is fixed on the moving element on the linear moving mechanism and is driven by the moving element to move on the linear moving mechanism. The calibration object is arranged in front of sight line of the visual sensor and used for calibrating posture of the visual sensor. The vision sensor shoots the calibration object at different moving positions on the linear moving mechanism, and the data processing system obtains shooting result, and
(Continued)

calculates the coordinate system conversion matrix from the linear moving mechanism coordinate system at moving position point to the preset linear moving mechanism coordinate system, thereby analyzing the positioning error of the linear moving mechanism.

8 Claims, 6 Drawing Sheets

(56) References Cited

FOREIGN PATENT DOCUMENTS

| | | | |
|---|---|---|---|
| CN | 105716582 | A | 6/2016 |
| CN | 107631690 | A | 1/2018 |
| CN | 109754428 | A | 5/2019 |
| CN | 111829412 | A | 10/2020 |
| CN | 112082512 | A | 12/2020 |
| CN | 112802124 | A | 5/2021 |
| CN | 113052919 | A | 6/2021 |
| CN | 115810041 | A | 3/2023 |
| DE | 102007004934 | A1 | 7/2008 |
| JP | 1992344411 | A | 12/1992 |
| JP | 1997308978 | A | 12/1997 |

OTHER PUBLICATIONS

Yulei Ye, Zhifeng Zhou, Liduan Wang, Zhengya Pang, A calibration method for multi-line lidar and GNSS/INS system, journal, 2020, pp. 0030-0036, issue 01, Laser and infrared, China.

Jiahui Yu, Research on calibration method of line laser 3D measurement system, journal, 2023, pp. 0037-0049, issue 02, Basic science, China.

* cited by examiner

METHOD AND SYSTEM FOR DETECTING POSITIONING ERROR OF LINEAR MOVING MECHANISM

CROSS-REFERENCE TO RELATED APPLICATIONS

This application is a continuation of PCT/CN2024/106575, filed on Jul. 19, 2024 and claims priority of Chinese Patent Application No. 202310869997.3, filed on Jul. 17, 2023, the contents of which are hereby incorporated by reference.

TECHNICAL FIELD

The disclosure relates to the technical field of testing and detection, in particular to a method and a system for detecting positioning error of a linear moving mechanism.

BACKGROUND

Linear moving mechanism is one of the main motion bearing tools in industrial automation/intelligent application at present. Although the linear moving mechanism has direct commercial products, in the current industrial automation/intelligent applications, such as the automation and intelligent transformation of factories, a large part of it is customized or self-processed and assembled according to the application requirements.

In the moving process of the actual application scene, the linear moving mechanism will produce geometric errors that are inconsistent with the preset, including but not limited to various geometric errors such as positioning, attitude (such as pitch angle, yaw angle and roll angle, etc.), trajectory, etc. Especially in the field of automatic measurement and guiding positioning, the angular freedom error of the linear moving mechanism in the moving process will often have a noticeable impact on the measurement results.

There are many sources of positioning errors produced by linear moving mechanism in practical application, which mainly include the following categories: first, the manufacturing accuracy of the moving mechanism itself, such as flatness/straightness and roughness of the mounting surface; second, deformation errors, such as mechanism damage and deformation caused by carelessness during transportation; third, assembly/assemblage/fixing errors, such as tightness, installation parallelism, splicing coplanarity, etc., are very susceptible to be affected by motion/vibration.

The traditional level/digital level measuring method, flat micrometer and three-coordinate instrument can measure the concave and convex of the machined object surface, but these methods are laborious and labor-consuming, and can only detect the static machining state of the parts, but can not detect the dynamic real-time deflection during the moving process.

At present, the dynamic multi-degree-of-freedom geometric error measurement is mostly used to detect the linear moving mechanism, and the measurement methods are mainly divided into contact measurement and non-contact measurement: first, the contact measurement method is mostly measured by coordinate measuring machine, which is easily disturbed by the vibration of the moving mechanism itself and the contact force during contact measurement, and the measurement accuracy is low; second, non-contact measurement methods are mainly divided into optical measurement, acoustic measurement and electromagnetic measurement. For the operating mechanism, the dynamic performance of optical measurement is obviously better than the other two measurement methods, but optical measurement methods (such as the combined measurement method based on laser interferometer and collimator and the measurement method based on laser tracking interferometer) generally contain complex lens groups, and the assembly and measurement process are complicated, and the instruments are expensive and costs are too high.

In the application of industrial automation/intelligence, the error detection requirements of linear moving mechanism have the following characteristics: first, the size/structural range/difference of moving mechanism is large; second, Most of them are customized processing and assembly mechanisms, and the error from assembly/assemblage accounts for a high proportion, which belongs to adjustable error and needs repeated real-time detection-adjustment process; third, the mechanism position of the actual motion scene is inconsistent, which may be on the ground or in the air. At present, the non-contact detection method of linear moving mechanism is generally based on the size customization design of linear moving mechanism, and the disassembly and assembly process is complicated, which requires high operators. Coordinate instrument is suitable for ground placement measurement, not for the actual use scene of moving mechanism.

SUMMARY

The disclosure aims to solve the above problems, and provides a method for detecting the positioning error of a linear moving mechanism, which can quickly and accurately measure the dynamic/static positioning error, and has the advantages of simple structure, high universality, quick and convenient disassembly and assembly, suitability for practical application scenarios and high cost performance.

The technical scheme provided by the disclosure to solve the problem is as follows: a method for detecting positioning error of a linear moving mechanism includes a linear moving mechanism, a moving element, a visual sensor, a calibration object and a data processing system; where rigidly fixing the vision sensor on the moving element on the linear moving mechanism directly or through a customized fixing structure, and driving the vision sensor to move on the linear moving mechanism by the moving element; arranging the calibration object in front of sight line of the visual sensor, so as to be used for calibrating posture of the visual sensor; shooting the calibration object at different moving position point $P_i$ on the linear moving mechanism by the vision sensor, and sending shooting results to the data processing system, where i≥1 and is an integer; obtaining the shooting results by the data processing system, calculating a coordinate system conversion matrix $H_{Line(i)2line(s)}$ from a linear moving mechanism coordinate system to a preset linear moving mechanism coordinate system at moving position point $P_i$ based on a formula (1) and a formula (2), and analyzing positioning error of the linear moving mechanism through the $H_{Line(i)2line(s)}$ coordinate system conversion matrix;

$$H_{cam(r)2Line(s)} * H_{calib2cam(r)} = H_{Line(i)2line(s)} * H_{cam(i)2Line(i)} * H_{calib2cam(i)}; \quad (1)$$

$$H_{cam(i)2Line(i)} = H_{cam(r)2Line(s)}; \quad (2)$$

where, $H_{cam(r)2Line(s)}$ is a coordinate system conversion matrix from a vision sensor coordinate system at a selected reference position to a linear moving mechanism coordinate system at a reference position, $H_{calib2cam(r)}$ is a conversion matrix from a calibration object coordinate system to the vision sensor coordinate system at a selected reference position, and $H_{calib2cam(i)}$ is a coordinate system conversion matrix from the calibration object coordinate system to a vision sensor coordinate system at moving position point $P_i$, and $H_{cam(i)2Line(i)}$ is a coordinate system conversion matrix between a vision sensor coordinate system when moving to position point $P_i$ of the linear moving mechanism relative to a linear moving mechanism coordinate system after moving position point $P_i$.

The positioning error of the linear moving mechanism includes a deflection angle error and a translation amount error relative to a preset linear moving mechanism coordinate system, where the deflection angle error includes a roll angle error $\theta_x$, a pitch angle error $\theta_y$ and a yaw angle error $\theta_z$, and the data processing system analyzes the deflection angle error through a coordinate conversion matrix based on a rotating matrix to Euler angle principle; a translation amount positioning error in a moving direction of a nonlinear moving mechanism is analyzed through a translation amount part of a coordinate conversion matrix.

The data processing system further analyzes a moving track of the linear moving mechanism through a set of coordinate conversion matrix $H_{Line(i)2line(s)}$, and analyzes positioning error source according to shape of the moving track.

Analyzing positioning error of the linear moving mechanism through coordinate conversion matrix $H_{Line(i)2line(s)}$ includes analyzing the moving track of the linear moving mechanism through the set of coordinate conversion matrix $H_{Line(i)2line(s)}$, and performing spatial linear fitting on the moving track of the linear moving mechanism, obtaining an average moving direction of the linear moving mechanism, correcting a moving direction of the preset linear moving mechanism coordinate system to the average moving direction, and calculating a conversion matrix $H_{Line(s)2line(r)}$ from the preset linear moving mechanism coordinate system to a corrected linear moving mechanism coordinate system, calculating the coordinate system conversion matrix $H_{Line(i)2line(r)}$ of a linear moving mechanism coordinate system at moving position point $P_i$ to the corrected linear moving mechanism coordinate system through $H_{Line(s)2line(r)}$, and analyzing the positioning error of the linear moving mechanism through coordinate system conversion matrix $H_{Line(i)2line(r)}$.

when the visual sensor is rigidly fixed on the moving element of the linear moving mechanism directly or through a customized fixing structure, setting method for maximizing detection accuracy of the deflection angle error in a single direction or in a plurality of directions includes:

when an optical axis direction of the vision sensor is set to be parallel to a moving direction X direction of the linear moving mechanism, maximise amplifying detection accuracy of pitch angle θy and yaw angle θz through optical lever action;

when the optical axis direction of the vision sensor is set to be parallel to Y direction, maximise amplifying detection accuracy of roll angle θx and yaw angle θz through optical lever action;

when the optical axis direction of the vision sensor is set to be parallel to Z direction, maximise amplifying detection accuracy of roll angle θx and pitch angle θy through optical lever action;

repeating detection steps by setting two mutually perpendicular optical axis directions of a same visual sensor or simultaneously setting two mutually perpendicular visual sensors for detection, so as to realize maximum accuracy detection of three deflection angles; by setting a single vision sensor in a direction of 45 degrees, evenly amplifying detection accuracy of roll angle θx, pitch angle θy and yaw angle θz.

Detection resolution of positioning geometric error is improved by improving resolution of the vision sensor.

The vision sensor is a 2D camera, and the calibration object is a plane with calibration features; or the vision sensor is a 3D camera, and the calibration object is a stereo target or a plane target.

When the moving element drives the visual sensor to move on the linear moving mechanism, the visual sensor is set to be soft triggered by a timer or hard triggered by a position sensor signal set on the linear moving mechanism.

The calibration object includes N complete calibration features, N≥1, and a pairwise attitude conversion matrix set between each of the complete calibration features has been calibrated in advance, and an attitude conversion matrix from any one of the complete calibration features to selected reference complete calibration feature is converted by the pairwise attitude conversion matrix set.

A system for detecting positioning error of a linear moving mechanism is provided and applies the method for detecting positioning error of a linear moving mechanism.

The disclosure has the following beneficial effects:

1. The structure is simple, and it is convenient to assemble and disassemble, which reduces the installation and adjustment difficulty and professional requirements for use of operators on the detection mechanism, and is suitable for repeated real-time detection-adjustment processes, so that it is convenient to minimize the assembly/assemblage error by adjusting the assembly/assemblage error.
2. The universality is high, and it can be applied not only to the positioning error of static scenes, but also to the error detection of dynamic moving scenes, and also to various practical application scenarios. It can not only detect the inherent machining error and deformation error within the precision order range corresponding to hardware selection, but also be suitable for the repeated detection-adjustment process of assembly/assemblage error. And it can be applied to mobile mechanisms with different sizes/structures simply by changing the selection and calibration of the vision sensor.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this description, illustrate embodiments consistent with the disclosure and together with the description, serve to explain the principles of the disclosure.

DETAILED DESCRIPTION OF THE EMBODIMENTS

In order to make the above objects, features and advantages of this disclosure more obvious and easy to understand, the disclosure will be further described in detail with the attached drawings and specific embodiments.

Figure 1:
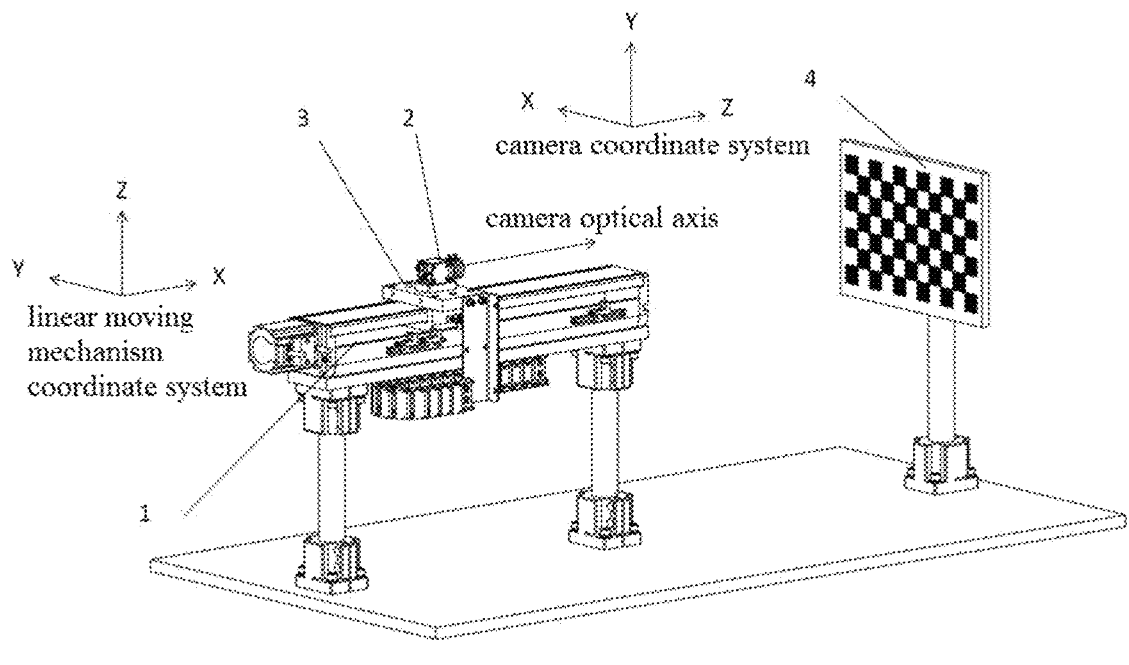
FIG. 1 is a structural schematic diagram of a first embodiment according to a system for detecting positioning error of a linear moving mechanism of the disclosure.

FIG. 1 shows the specific structure of an embodiment of a system for detecting positioning error of a linear moving mechanism. The system includes a linear moving mechanism 1, a moving element 2, a visual sensor 3, a calibration object 4 and a data processing system. The vision sensor 3 is rigidly fixed on the moving element 2 on the linear moving mechanism 1 directly or through a customized fixing structure, and the moving element 2 drives the vision sensor 3 to move on the linear moving mechanism; the calibration object 4 is arranged in front of sight line of the visual sensor 3, so as to be used for calibrating posture of the visual sensor 3; the vision sensor 3 shoots the calibration object 4 at different moving position point $P_i$ on the linear moving mechanism 1.

When the moving element 2 drives the visual sensor 3 to move on the linear moving mechanism 1, the visual sensor 3 can be set as a timer soft trigger, and the real-time position of the moving direction of the linear moving mechanism is calculated by multiplying the moving speed by the time. It can also be set to be hard triggered by the position sensor signal set on the linear moving mechanism, and the real-time position is obtained by the position sensor. According to the real-time position of the moving direction, the error of the moving direction can be obtained.

In order to improve the resolution of positioning geometric error detection, a higher resolution visual sensor can be selected when building the system. The detection resolution is related to the visual field range at the shooting distance of the calibration object and the point distance between two adjacent points in the visual sensor converted from the resolution of the visual sensor.

The preset linear moving mechanism coordinate system is set: for example, the moving direction is X axis, the vector parallel to the moving track plane is Y axis, the vector perpendicular to the moving track plane is Z axis, and the moving track plane is the plane that the linear moving mechanism passes through when moving.

The calibration object is a plane with calibration features: it can be a checkerboard calibration board, a dot calibration board or a two-dimensional code calibration board, the calibration object 4 is located in front of the sight line of the visual sensor 3, and the feature surface faces the visual sensor 3. Accordingly, the vision sensor should be a 2D camera.

The calibration object 4 and the vision sensor 3 are not limited to the above combination, and the vision sensor can also choose to use a 3D camera, and the calibration object correspondingly chooses a stereo target or a plane target.

The calibration object 4 includes one or more complete calibration features, and the pairwise attitude conversion matrix set among complete calibration features has been calibrated in advance, and the attitude conversion matrix from any complete calibration feature to the selected reference complete calibration feature can be converted by pairwise attitude conversion matrix set.

When the moving axis of the linear moving mechanism is too long, if the calibration object only includes one complete calibration feature, the visual sensor cannot completely shoot the complete calibration feature after moving for a certain distance. Therefore, in this case, it is necessary to set more calibration features along the line, so that the complete calibration feature that can be used to calculate the attitude of the visual sensor can be obtained as much as possible in each shooting result. When the moving axis of the linear moving mechanism is short, the visual sensor can shoot a single calibration feature during the moving process, so the calibration object can only contain one calibration feature.

Reference position of the vision sensor: the moving start position is preferred.

Optical axis: generally, the center line of the lens of the vision sensor is called the optical axis.

Direction setting of the vision sensor: the axis direction of the coordinate system is parallel to the preset linear moving mechanism coordinate system as much as possible, so as to quickly obtain the conversion matrix from the reference vision sensor to the preset linear moving mechanism coordinate system, and so as to facilitate the subsequent more intuitive observation and analysis, and it is not necessary to have one-to-one correspondence to the X axis, the Y axis and the Z axis. The direction of the vision sensor and the direction of the preset linear move mechanism can also be set to be non-parallel according to the requirement of detection accuracy and synchronization, for example, setting a single vision sensor to 45 degrees can synchronously detect the coordinates of three axes with high accuracy. The coordinate system conversion matrix can be obtained according to the attitude between the preset visual sensor and the linear moving mechanism in the drawing when designing and customizing fixing structure.

Figure 2:
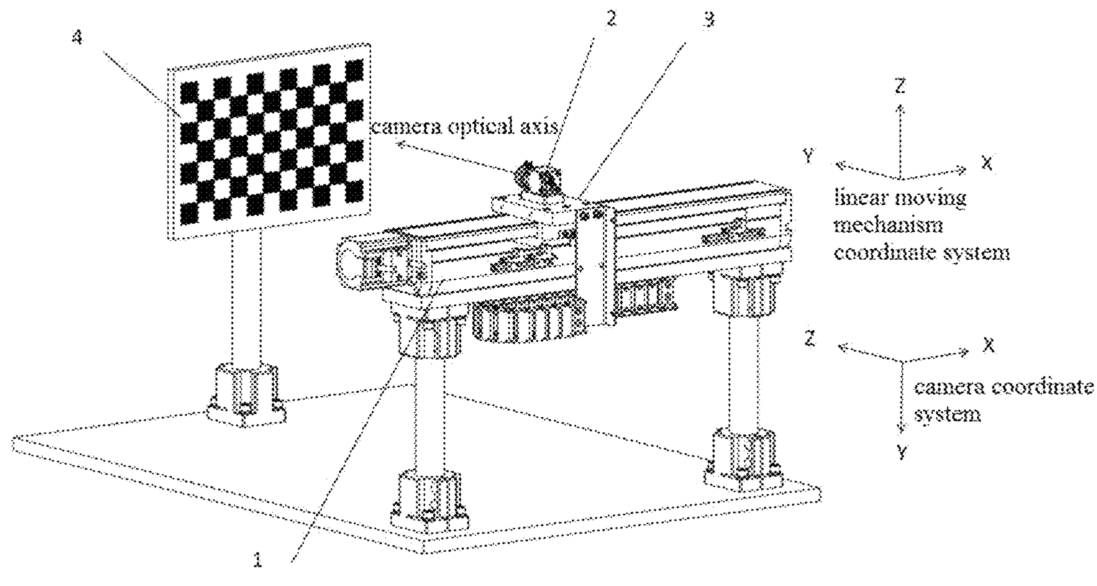
FIG. 2 is a structural schematic diagram of a second embodiment according to the system for detecting positioning error of a linear moving mechanism of the disclosure.
Figure 3:
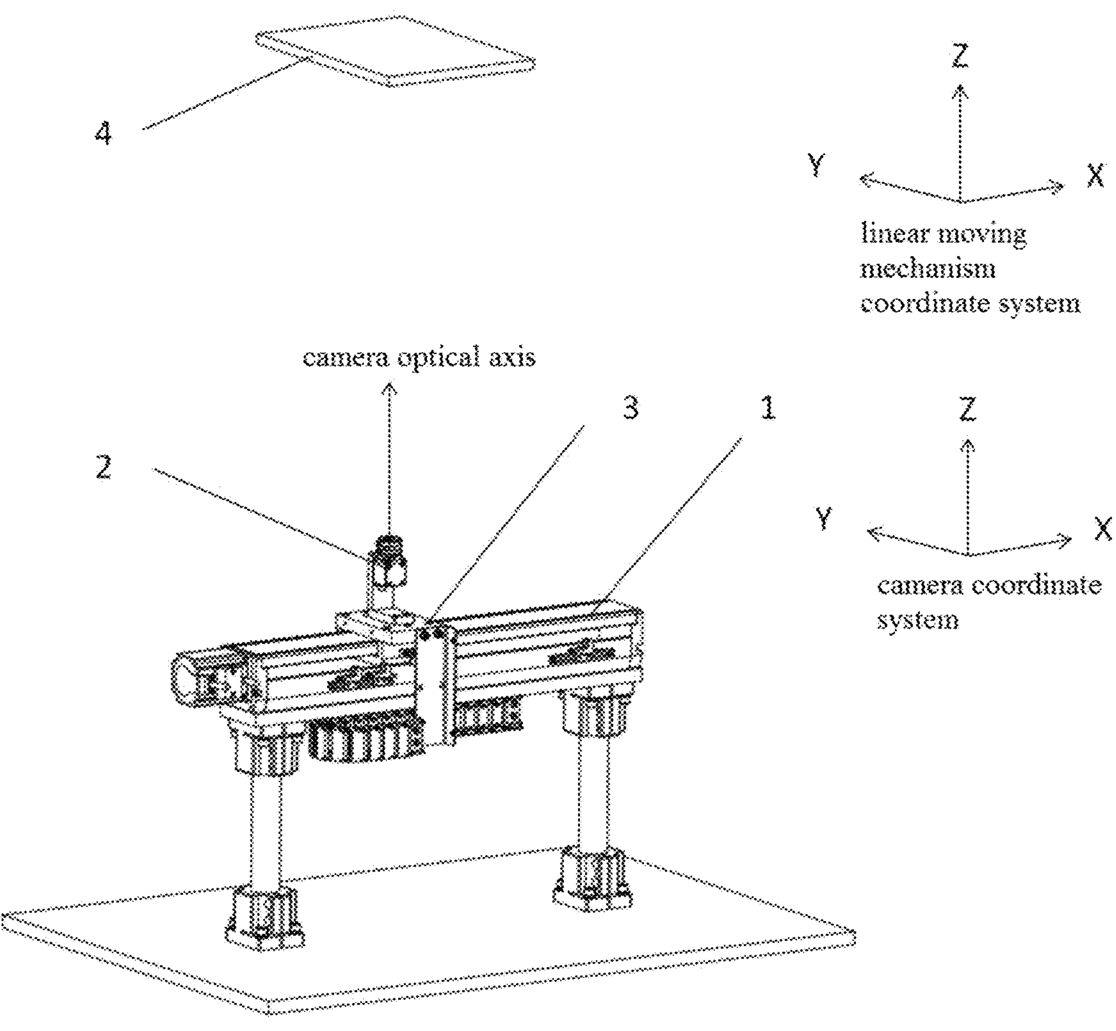
FIG. 3 is a structural schematic diagram of a third embodiment according to the system for detecting positioning error of a linear moving mechanism of the disclosure.
Figure 4:
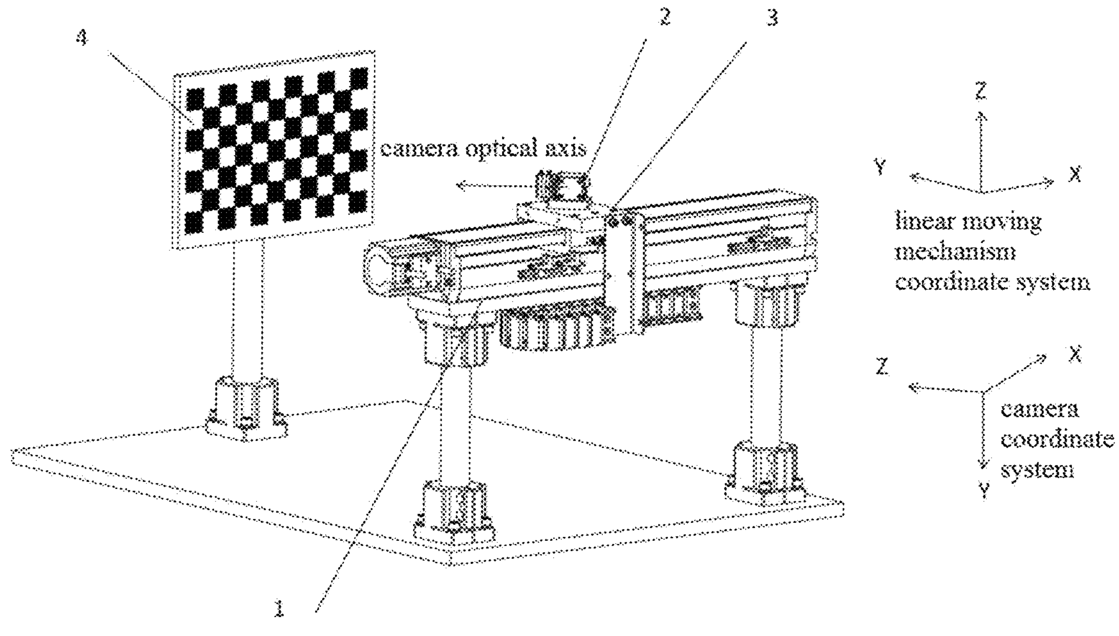
FIG. 4 is a structural schematic diagram of a fourth embodiment according to the system for detecting positioning error of a linear moving mechanism of the disclosure.

In the embodiment shown in FIG. 1, the optical axis direction of the vision sensor 3 is parallel to the X axis of the linear moving mechanism coordinate system. FIGS. 2, 3 and 4 respectively show another third embodiment of the positioning error detection system structure of the linear moving mechanism. The difference from the embodiment shown in FIG. 1 is that the optical axis direction of the vision sensor 3 in the second embodiment shown in FIG. 2 is parallel to the Y axis of the linear moving mechanism coordinate system. The third embodiment shown in FIG. 3, the optical axis direction of the vision sensor 3 is parallel to the Z axis of the linear moving mechanism coordinate system. In the fourth embodiment shown in FIG. 4, the optical axis direction of the vision sensor 3 rotates 45 degrees around the Z axis of the linear moving mechanism coordinate system relative to FIG. 2.

Figure 5:
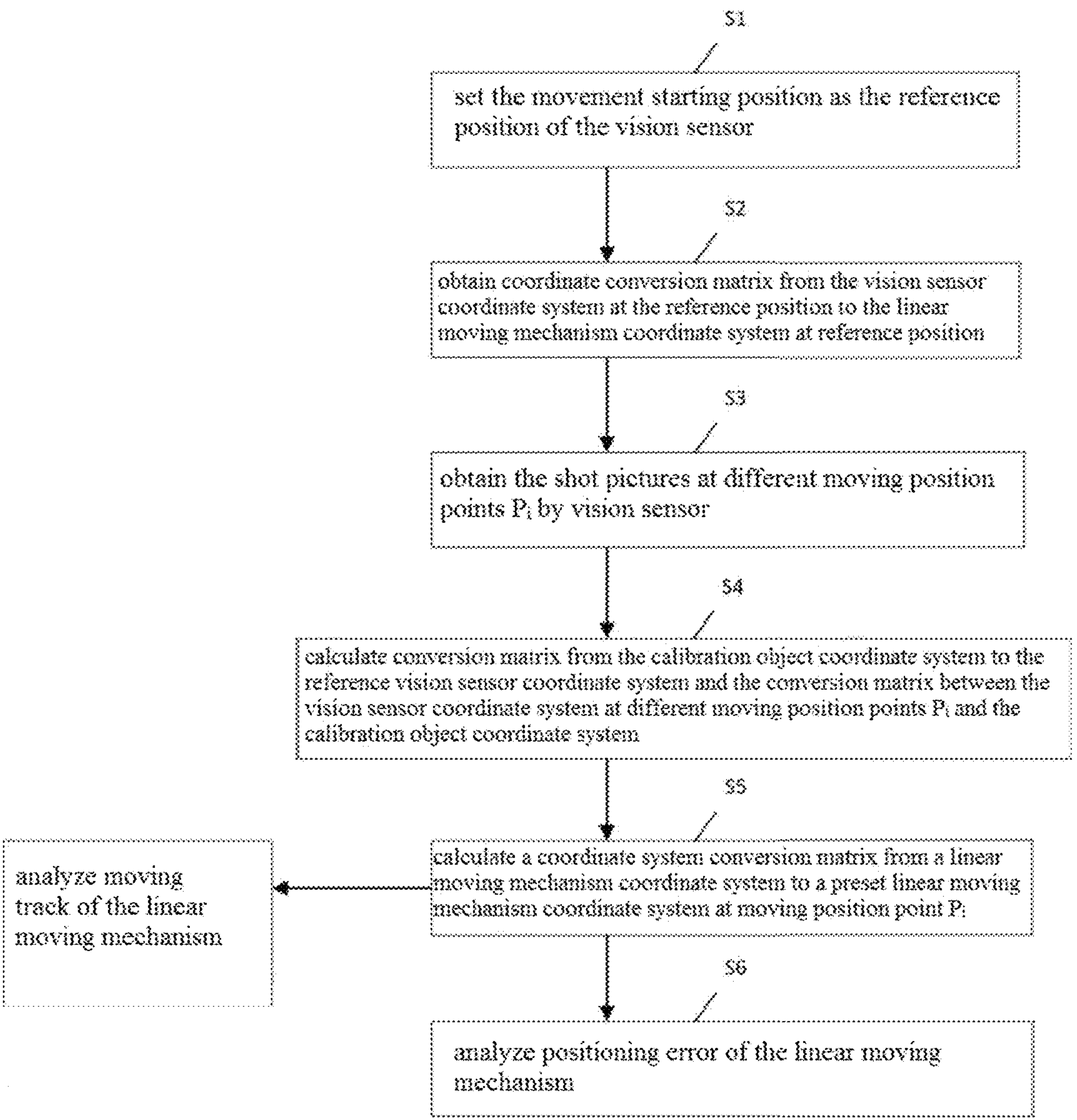
FIG. 5 is a flowchart of a method for detecting positioning error of a linear moving mechanism according to the disclosure.

With the above-mentioned error detection system and arrangement, the approximate calculation sequence of one embodiment of the positioning error detection method of the linear moving mechanism is shown in FIG. 5:

S1, the movement starting position is set as the reference position of the vision sensor;

S2, based on the preset linear moving mechanism coordinate system and the installation posture of the vision sensor at the reference position, the coordinate conversion matrix $H_{cam(r)2Line(s)}$ is obtained from the vision sensor coordinate system at the reference position to the linear moving mechanism coordinate system at reference position, as shown in FIG. 2, $$H_{cam(r)2Line(s)} = \begin{bmatrix} 1 & 0 & 0 & \Delta x \\ 0 & 0 & 1 & \Delta y \\ 0 & -1 & 0 & \Delta z \\ 0 & 0 & 0 & 1 \end{bmatrix};$$

Δx, Δy and Δz refer to the offset between the origin of the vision sensor coordinate system and the origin of the reference linear moving mechanism coordinate system, the origin of the 2D camera coordinate system is generally the center of the camera lens, and the origin of the 3D camera coordinate system is generally the center of the left camera lens;

S3, the vision sensor starts to move from the moving starting position, obtains the shot pictures at different moving position points $P_i$, and sends them to the data processing system;

S4, the data processing system calculates the conversion matrix $H_{calib2cam(r)}$ from the calibration object coordinate system to the reference vision sensor coordinate system based on the shooting result obtained from the reference position;

the data processing system calculates the conversion matrix $H_{calib2cam(i)}$ between the vision sensor coordinate system at different moving position points $P_i$ and the calibration object coordinate system;

because the vision sensor is rigidly fixed, the conversion matrix between the linear moving mechanism coordinate system after moving and the vision sensor coordinate system remains unchanged;

S5, thus, a coordinate system conversion matrix $H_{Line(i)2line(s)}$ is calculated from a linear moving mechanism coordinate system to a preset linear moving mechanism coordinate system at moving position point $P_i$ by a formula (1) and a formula (2);

$$H_{cam(r)2Line(s)} * H_{calib2cam(r)} = H_{Line(i)2line(s)} * H_{cam(i)2Line(i)} * H_{calib2cam(i)}; \quad (1)$$

$$H_{cam(i)2Line(i)} = H_{cam(r)2Line(s)}; \quad (2)$$

where, $H_{cam(i)2Line(i)}$ is a coordinate system conversion matrix between a vision sensor coordinate system when moving to position point $P_i$ of the linear moving mechanism relative to a linear moving mechanism coordinate system after moving position point $P_i$;

S6, the positioning error of the linear moving mechanism is analyzed through the coordinate conversion matrix $H_{Line(i)2line(s)}$.

Each coordinate conversion matrix $H_{Line(i)2line(s)}$ obtains the information of a point, including xyz position and attitude, the set of points at all $P_i$ positions of the linear moving mechanism is summarized into a moving track, and the attitude direction can also be marked on each point on the moving track. Therefore, in addition to analyzing the positioning error, the data processing system can also analyze the moving track of the linear moving mechanism through the set of coordinate conversion matrix $H_{Line(i)2line(s)}$, and analyze the positioning error source according to the shape of the moving track.

The positioning errors of the linear moving mechanism calculated by the above processes S1 to S6 include the deflection angle error and translation amount error relative to the preset linear moving mechanism coordinate system, and the deflection angle error includes the roll angle error θx, the pitch angle error θy and the yaw angle error θz, and the data processing system analyzes the deflection angle error relative to the preset linear moving mechanism coordinate system through the coordinate conversion matrix based on the principle of rotating matrix to Euler angle; through the translation amount part of coordinate conversion matrix, the positioning error of translation amount in the moving direction of nonlinear moving mechanism can be analyzed.

If it is found that the direction deviation of the moving track of the linear moving mechanism is relatively large, and you want to obtain a more quantitative analysis intuitively, you can make further corrections by the following steps: the data processing system performs spatial linear fitting on the moving track of the linear moving mechanism to obtain the average moving direction of the $H_{Line(s)2line(r)}$ linear moving mechanism, the moving direction of the $H_{Line(s)2line(r)}$ preset linear moving mechanism coordinate system is corrected to the $H_{Line(s)2line(r)}$ average moving direction, and the conversion matrix $H_{Line(s)2line(r)}$ from the $H_{Line(s)2line(r)}$ preset linear moving mechanism coordinate system to the corrected linear moving mechanism coordinate system is calculated. The coordinate system conversion matrix $H_{Line(i)2line(r)}$ of the linear moving mechanism coordinate system at the moving position point $P_i$ to the corrected linear moving mechanism coordinate system is calculated by $H_{Line(s)2line(r)}$, and the positioning error of the $H_{Line(s)2line(r)}$ linear moving mechanism is analyzed by $H_{Line(i)2line(r)}$ coordinate conversion matrix.

When the vision sensor is rigidly fixed on the moving element of the linear moving mechanism directly or through a customized fixing structure, the detection accuracy of the deflection angle error in a single direction or in multiple directions can be maximized by the following setting methods:

first, when an optical axis direction of the vision sensor is set to be parallel to a moving direction X direction of the linear moving mechanism (as shown in FIG. 1), detection accuracy of pitch angle θy and yaw angle θz is maximise amplifyed;

second, when the optical axis direction of the vision sensor is set to be parallel to Y direction (as shown in FIG. 2), detection accuracy of roll angle θx and yaw angle θz is maximise amplifyed;

third, when the optical axis direction of the vision sensor is set to be parallel to Z direction (as shown in FIG. 3), detection accuracy of roll angle θx and pitch angle θy is maximise amplifyed.

Through repeating the detection steps by setting two mutually perpendicular optical axis directions of the same visual sensor or simultaneously setting two mutually perpendicular visual sensors for detection, the maximum accuracy detection of the three deflection angles can be realized.

Figure 6:
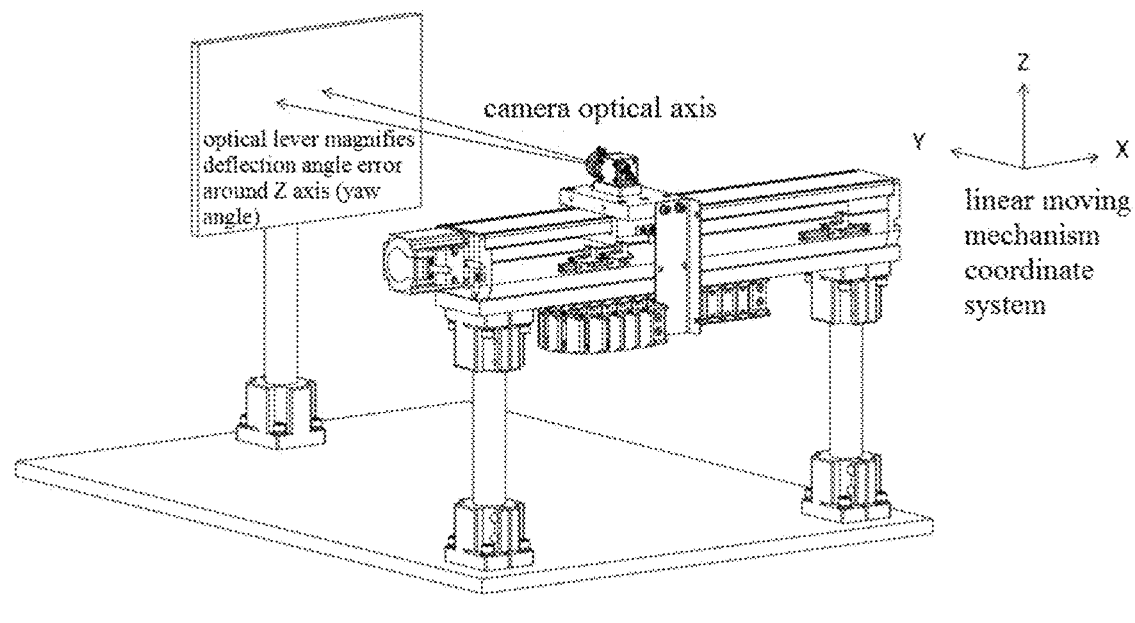
FIG. 6 is a schematic diagram for amplifying deflection angle error of the method for detecting positioning error of a linear moving mechanism according to the disclosure.

The principle of amplifying deflection angle error and the principle of maximizing deflection angle detection accuracy are as follows: the change of deflection angle rotating around the non-camera optical axis will drive the camera optical axis to rotate, and the change of deflection angle will be converted into displacement change through the camera optical axis, and the displacement change value is related to the distance between the camera optical axis and the calibration object and the included angle between the camera optical axis and the linear moving mechanism. Increasing the distance or increasing the perpendicularity between the optical axis and an axis of the linear moving mechanism can improve the detection accuracy of the deflection angle around this axis. The latter is because when the camera optical axis is perpendicular to an axis of the linear moving mechanism, the variation of the deflection angle around this vertical axis is converted into the rotation of the camera optical axis to the maximum, thus maximizing the displacement variation, thus maximizing the detection accuracy of the deflection angle around this vertical axis. FIG. 6 illustrates the variation of the deflection angle around the Z axis (non-camera optical axis) of the linear moving mechanism coordinate system, that is, the yaw angle, which leads to the rotation of the camera optical axis, then is converted into the displacement change of the calibration object.

Compared with the prior art, the system and the method provided by the disclosure are simple in structure, convenient to assemble and disassemble, which reduces the installation and adjustment difficulty and professional requirements for use of operators on the detection mechanism, and is suitable for repeated real-time detection-adjustment processes, so that it is convenient to minimize the assembly/assemblage error by adjusting the assembly/assemblage error. The universality is high, and it can be applied not only to the positioning error of static scenes, but also to the error detection of dynamic moving scenes, and also to various practical application scenarios. It can not only detect the inherent machining error and deformation error within the precision order range corresponding to hardware selection, but also be suitable for the repeated detection-adjustment process of assembly/assemblage error. And it can be applied to mobile mechanisms with different sizes/structures simply by changing the selection and calibration of the vision sensor.

In addition, it should be understood that the above embodiments only express several implementations of the disclosure, and their descriptions are more specific and detailed, but they should not be understood as limiting the scope of the disclosure. It should be pointed out that for those skilled in the art, without departing from the concept of the disclosure, a number of variations and improvements can be made, which are within the scope of protection of the disclosure.

What is claimed is:

1. A method for detecting positioning error of a linear moving mechanism, comprising:

rigidly fixing a vision sensor on a moving element of the linear moving mechanism:

arranging a calibration object in front of sight line of the visual sensor;

arranging the vision sensor at a reference position, using the vision sensor to shoot the calibration object, and obtaining first shooting results of the calibration object;

controlling the linear moving mechanism to move, including driving the vision sensor to move along the linear moving mechanism by the moving element to a position point $P_i$, controlling the vision sensor to shoot the calibration object at the position point Pi, and obtaining second shooting results of the calibration object, wherein i≥1 and is an integer; obtaining the first shooting results and the second shooting results by a data processing system, calculating a coordinate system conversion matrix $H_{Line(i)/2Line(s)}$ from a linear moving mechanism coordinate system to the preset linear moving mechanism coordinate system at moving position point $P_i$ based on a formula (1) and a formula (2) and an installation posture of the vision sensor at the reference position in combination with the first shooting results and the second shooting results, and analyzing a positioning error of the linear moving mechanism using the calculated coordinate system conversion matrix $H_{Line(i)/2Line(s)}$:

$$H_{cam(r)2Line(s)} * H_{calib2cam(r)} = H_{Line(i)2line(s)} * H_{cam(i)2Line(i)} * H_{calib2cam(i)}; \quad (1)$$

$$H_{cam(i)2Line(i)} = H_{cam(r)2Line(s)}; \quad (2)$$

wherein $H_{calib2cam(r)}$ is a conversion matrix from the calibration object coordinate system to the vision sensor coordinate system at a selected reference position, and $H_{calib2cam(i)}$ is a coordinate system conversion matrix from the calibration object coordinate system to the vision sensor coordinate system at moving position point $P_i$, and $H_{cam(i)2Line(i)}$ is a coordinate system conversion matrix between the vision sensor coordinate system when moving to position point $P_i$ of the linear moving mechanism relative to the linear moving mechanism coordinate system after moving position point $P_i$, detecting an assembly error of the linear moving mechanism based on the analyzed positioning error, and repeatedly detecting and adjusting the assembly error to obtain a minimized assembly error, and correcting the linear moving mechanism based on the minimized assembly error to obtain a corrected linear movement mechanism, wherein the method further comprises when the moving element drives the visual sensor to move on the linear moving mechanism, setting the visual sensor to be soft triggered by a timer or hard triggered by a position sensor signal set on the linear moving mechanism.

2. The method for detecting positioning error of a linear moving mechanism according to claim 1, wherein the positioning error of the linear moving mechanism comprises a deflection angle error and a translation amount error relative to the preset linear moving mechanism coordinate system, wherein the deflection angle error comprises a roll angle error 0x, a pitch angle error Θy and a yaw angle error Oz, and the data processing system analyzes the deflection angle error through a coordinate conversion matrix based on a rotating matrix to Euler angle principle; a translation amount positioning error of the linear moving mechanism is analyzed through a translation amount part of a coordinate conversion matrix.

3. The method for detecting positioning error of a linear moving mechanism according to claim 2, wherein when the visual sensor is rigidly fixed on the moving element of the linear moving mechanism directly or through a customized fixing structure, setting method for maximizing detection accuracy of the deflection angle error in a single direction or in a plurality of directions comprises: when an optical axis direction of the vision sensor is set to be parallel to a moving direction X direction of the linear moving mechanism, maximise amplifying detection accuracy of pitch angle Θy and yaw angle Θz through optical lever action;

when the optical axis direction of the vision sensor is set to be parallel to Y direction, maximise amplifying detection accuracy of roll angle 0x and yaw angle Oz through optical lever action; when the optical axis direction of the vision sensor is set to be parallel to Z direction, maximise amplifying detection accuracy of roll angle 0x and pitch angle Θy through optical lever action; repeating detection steps by setting two mutually perpendicular optical axis directions of a same visual sensor or simultaneously setting two mutually perpendicular visual sensors for detection, so as to realize maximum accuracy detection of three deflection angles; by setting a single vision sensor in a direction of 45 degrees, evenly amplifying detection accuracy of roll angle 0x, pitch angle Θy and yaw angle Oz.

4. The method for detecting positioning error of a linear moving mechanism according to claim 1, wherein the data processing system further analyzes a moving track of the linear moving mechanism through a set of $H_{Linc(i)2line(s)}$ coordinate conversion matrix, and analyzes positioning error source according to shape of the moving track.

5. The method for detecting positioning error of a linear moving mechanism according to claim 1, wherein the analyzing positioning error of the linear moving mechanism through the $H_{Line(i)2line(s)}$ coordinate system conversion matrix comprises: analyzing the moving track of the linear moving mechanism through the set of $H_{Line(i)2line(s)}$ coordinate conversion matrix, and performing spatial linear fitting on the moving track of the linear moving mechanism, obtaining an average moving direction of the linear moving mechanism, correcting a moving direction of the preset linear moving mechanism coordinate system to the average moving direction, and calculating a conversion matrix $H_{Line(s)2line(r)}$ from the preset linear moving mechanism coordinate system to a corrected linear moving mechanism coordinate system, calculating the coordinate system conversion matrix $H_{Line(i)2line(r)}$ of the linear moving mechanism coordinate system at moving position point $P_i$ to the corrected linear moving mechanism coordinate system through $H_{Line(s)2line(r)}$, and analyzing the positioning error of the linear moving mechanism through $H_{Line(i)2line(r)}$ coordinate system conversion matrix.

6. The method for detecting positioning error of a linear moving mechanism according to claim 1, further comprising improving detection resolution of positioning geometric error by improving resolution of the vision sensor.

7. The method for detecting positioning error of a linear moving mechanism according to claim 1, wherein the vision sensor is a 2D camera, and the calibration object is a plane with calibration features; or the vision sensor is a 3D camera, and the calibration object is a stereo target or a plane target.

8. The method for detecting positioning error of a linear moving mechanism according to claim 1, wherein the calibration object comprises N complete calibration features, N≥1, and a pairwise attitude conversion matrix set between each of the complete calibration features has been calibrated in advance, and an attitude conversion matrix from any one of the complete calibration features to selected reference complete calibration feature is converted by the pairwise attitude conversion matrix set.

* * * * *